June 29, 1965  H. C. SCHMIDT  3,191,873
ELECTRICALLY DRIVEN COFFEE MILL
Filed March 10, 1961  4 Sheets-Sheet 1

INVENTOR.
Hans C. Schmidt
BY
Watson, Cole, Grindle & Watson
Attys.

June 29, 1965  H. C. SCHMIDT  3,191,873
ELECTRICALLY DRIVEN COFFEE MILL
Filed March 10, 1961  4 Sheets-Sheet 2

INVENTOR.
Hans C. Schmidt
BY
Watson, Cole, Grindle + Watson
Attys.

June 29, 1965   H. C. SCHMIDT   3,191,873
ELECTRICALLY DRIVEN COFFEE MILL
Filed March 10, 1961   4 Sheets-Sheet 4

INVENTOR.
Hans C. Schmidt
BY
Watson, Cole, Grindle & Watson
Attys.

3,191,873
ELECTRICALLY DRIVEN COFFEE MILL
Hans C. Schmidt, Contrescarpe 63, Bremen, Germany
Filed Mar. 10, 1961, Ser. No. 94,731
Claims priority, application Germany, Mar. 16, 1960,
Sch 27,598; Jan. 26, 1961, W 29,342
1 Claim. (Cl. 241—74)

The invention relates to an electrically driven coffee mill with a high-sped motor with vertical shaft and a beater knife mounted directly on the shaft above the motor.

Electrically driven coffee mills of the type described are known in which the beater knife rotates in a closed compartment into which the coffee beams are filled. In this compartment the whole of the material to be ground is worked by the beater knife until the desired degree of fineness has been attained. These coffee mills are open to the objection that the material always moves in a circuit and the ground coffee contains particles varying considerably in size. In particularly there is a relatively large percentage of coffee in pulverulent state which is not desirable. Moreover, the coffee being continually circulated becomes heated, which has a detrimental affect on its flavour.

Coffee mills are also known in which a beater rotates in a sieve and flings the coffee beans introduced through an inlet against projections within the sieve, with the result that the coffee beans are broken up. These broken-up pieces are thrown through the perforations of the sieve and drop into a collecting compartment arranged below the sieve. Such coffee mills are relatively expensive.

The object of the invention is to produce a coffee mill which entails little expense and which is capable of grinding the coffee practically only to the desired particle size.

Another object of the invention is to construct the coffee mill so that it is easy to clean, so as thereby to prevent the accumulation of coffee residues which become rancid in time and have a very detrimental effect on the flavour of the coffee.

The invention is characterized in that a sieve concentrically surrounding the motor and beater shaft is provided and this sieve is closed in by a compartment for collecting the ground product. The collecting compartment for the ground product preferably engages the sieve from above and is closed against the housing of the mill underneath the sieve and removable in upward direction. In a preferred embodiment of the invention, the sieve tapers conically towards the top. In particular, the beater knife arranged near the bottom of the sieve has upwardly bent cutting arms, the perforated portion of the upwardly tapering sieve surrounds the ends of the cutting arms with slight clearance and the collecting compartment surrounding the sieve has a domed part increasing the capacity of the sieve, and covering the upper sieve opening serving for introducing the coffee beans. At the same time the sieve narrowing towards the top can be lengthened in upward direction by a funnel-like filling extension.

To obtain a maximum yield of ground coffee with a particle size in the order of 0.3 to 0.8 mm., the sieve holes are about 1.4 mm. in diameter. The preferred angle of slant of the side wall is about 2° to the vertical and, for example in the case of a knife diameter of 49 mm., the bottom clearance of the ends of the cutting arms amounts to about 11 to 12 mm. and that of the part of the knife attached to the motor shaft about 3 to 4 mm., and the ends of the cutting arms are at a distance of about 1 to 2 mm. from the sieve wall.

A particularly favourable construction is obtained if the housing consists of a cup accommodating the driving motor, a flange closing this cup and a cup for the ground product covering the sieve, and if the join between the ground product cup and the flange is lower than the lower edge of the sieve when the mill is in position for grinding.

Several embodiments of the invention are hereinafter described by way of example with reference to the accompanying drawings, in which.

Figure 1:
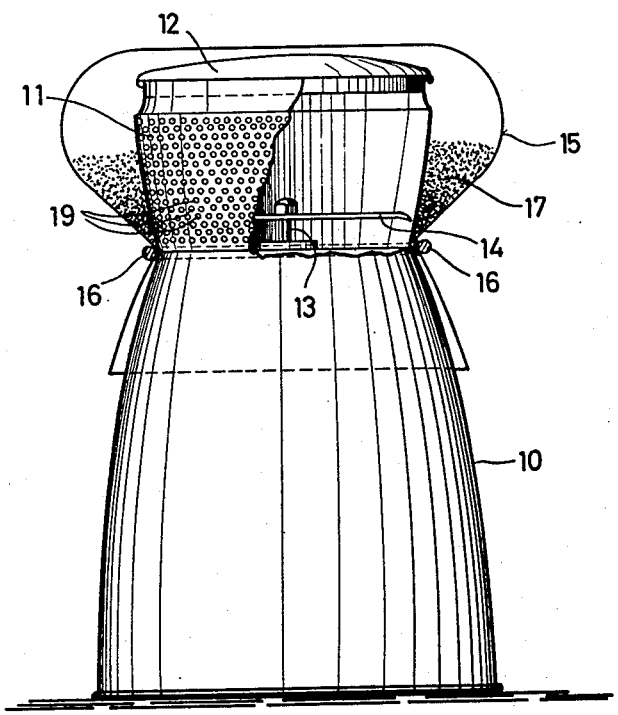
FIG. 1 shows a simple construction of a coffee mill according to the invention.
Figures 2, 3:
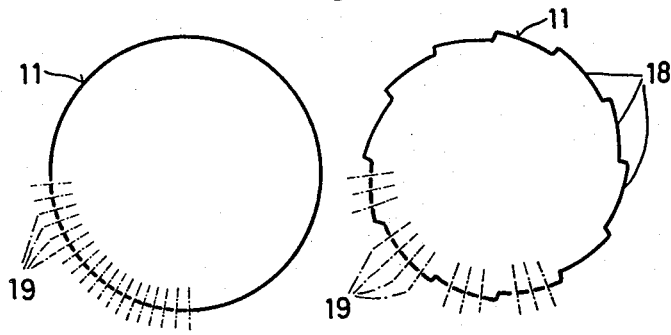
FIG. 2 is a diagrammatic section through the sieve with holes widening conically in outward direction.
FIG. 3 is a cross-section through a sieve of modified construction.

In FIGS. 1 to 3 the housing containing the driving motor is designated by 10 and a sieve 11 is mounted on this housing. The filling opening of the sieve is closed by a lid 12. A beater knife 14 is fixed on the motor shaft 13 within the sieve 11. This sieve 11 is surrounded by a bag 15 which is secured in position by means of a string 16 and receives the ground coffee. A metal container covered by a lid can also be provided instead of the bag 15.

FIGS. 2 and 3 show cross-sections of two types of sieves. The sieve according to FIG. 2 is of circular cross-section whereas that of FIG. 3 is composed of steps 18.

The perforations or holes 19 of the sieve preferably widen in outward direction so as to prevent them from becoming clogged with the ground coffee.

Figure 4:
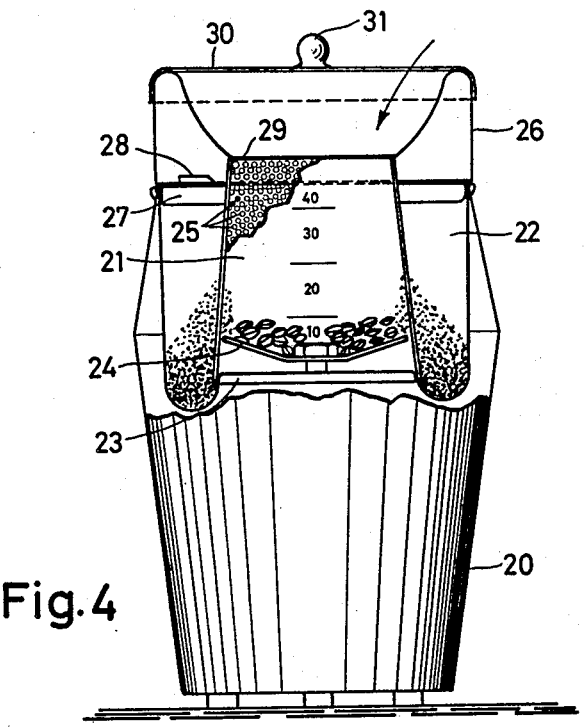
FIG. 4 is another form of construction in side elevation.
Figure 5:
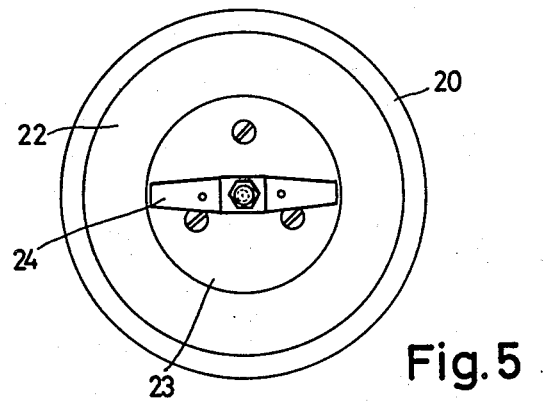
FIG. 5 is a top plan view of the embodiment shown in FIG. 4.

In FIG. 4 the housing containing the motor is designated by 20. 21 is the sieve and 22 the container for receiving the ground product and surrounding the sieve. The sieve narrows conically towards the top and is fixed on a projection 23 of the housing 20. Inside the sieve 21 the beater knife 24 is fixed on the motor shaft. The beater knife has upwardly bent arms.

Marks are provided on the sieve 21 with the aid of which the quantity of coffee beans filled into the sieve can be read. The ground coffee is flung through the sieve holes 25 as soon as the individual particles are smaller than the diameter of the sieve holes.

Above the sieve 21 there is a coffee filling funnel 26 which is fitted on the container 22 for the ground product or on the upper edge of the housing 20. The lower edge 27 of this funnel bears tightly against the inner wall of the ground product container. At the joint between the upper edge of the ground product container 22 and the edge of the filling funnel 26 bearing on the container edge there is a slot 28 in which a tool can be inserted to facilitate lifting the filling funnel off. A coin can, for example, be used as a tool.

The filling funnel 26 has an opening 29 which corresponds substantially to the upper opening of the sieve 21. The filling funnel 26 is closed at the top by a lid 20 which is provided with a handle 31.

Figure 6:
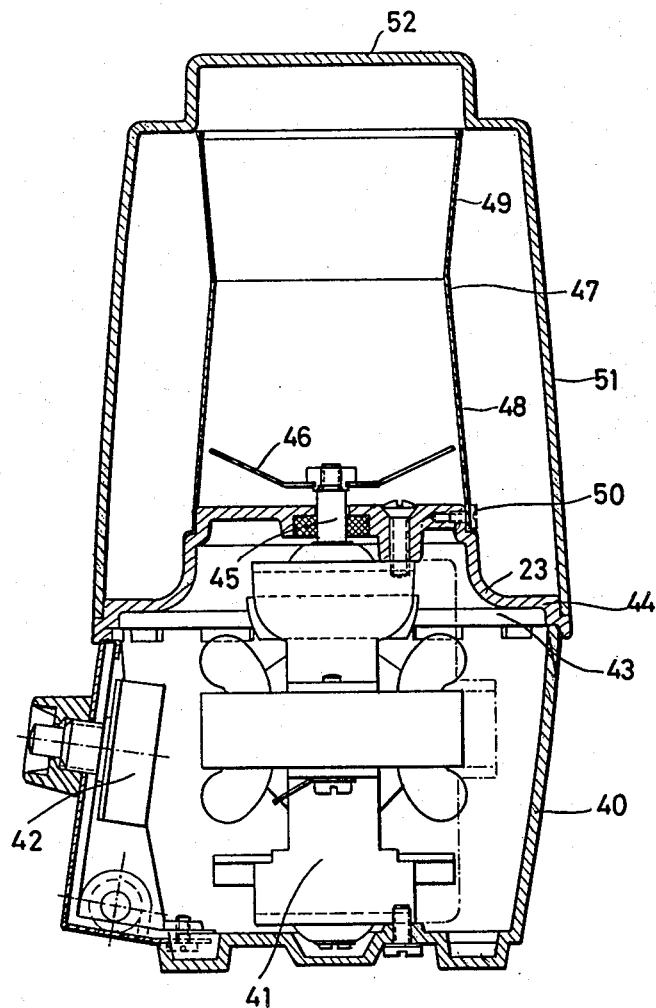
FIG. 6 shows yet another form of construction in side elevation, partly in section.
Figure 8:
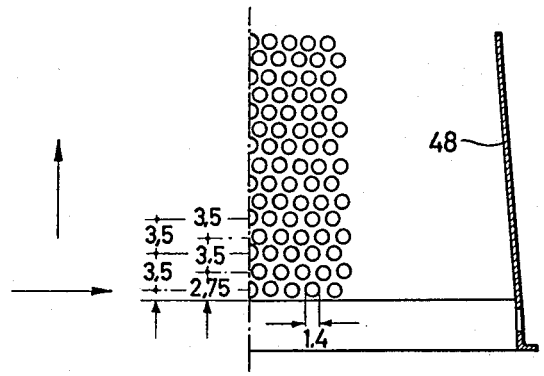
FIG. 8 shows a part of the sieve of the embodiment illustrated in FIG. 6.
Figure 7:
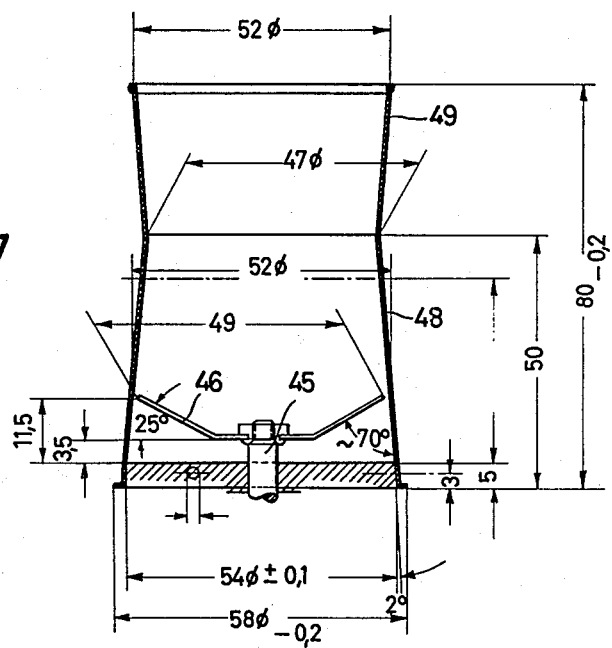
FIG. 7 shows the sieve and the beater knife rotating in the sieve of the construction illustrated in FIG. 6.

In the embodiment illustrated in FIGS. 6 to 8, the housing accommodating the motor 41 is designated by 40 and has an opening for allowing the passage of a press-button switch 42. The motor 40 is closed at the top by a plate 43. This plate 43 carries a flange 44 through the upper part of which the motor shaft 45 passes and carries the beater knife 46.

The sieve 47 is arranged concentrically with the knife or motor shaft 45 and comprises a lower perforated part 48 surrounding the beater knife 46 and narrowing in upward direction, and a funnel-shaped filling extension 49 extending upwards from the perforated part 48. This filling extension 49 increases the size of the space for receiving the material to be ground and facilitates its introduction into the mill. The sieve part 48 is fixed on the cylindrical part of the flange 44 by means of screws 50.

The sieve is surrounded by a cup-shaped catching receptacle 51 which is held by a shoulder in the periphery of the annular part of the flange. The bottom of the cup 51 has a domed portion 52 which covers the upper opening of the filling extension 49 and increases the space in the interior of the sieve and consequently, when the sieve space contains a large quantity of material to be ground, allows this material to rise in the sieve when the mill is set in operation, so that excessive friction between the beater knife and the material is prevented. The catching receptacle 51 preferably consists of transparent material which enables the grinding procedure to be observed.

The flange 44 is made of metal and has between its cylindrical part carrying the sieve 48 and its annular part carrying the cup 51, a neck 53 with only slight curvature, which facilitates the cleaning of the space surrounding the catching receptacle 51.

FIG. 7 is a scale drawing of the sieve. The construction of the sieve part 48 surrounding the beater knife 46 and the wall of which leans at an angle of about 2° to the vertical is of particular importance for the perfect operation of the coffee mill according to the invention. The shape of the beater knife, its arrangement above the sieve part as well as the inclination of the upwardly bent beater arms in relation to the sieve wall amounting to about 70° are also important features. It has been found that with such a construction of the sieve and beater knife practically no coffee residue remains in the sieve space. For obtaining maximum yield of the desired particles in the order of between 0.3 to 0.8 mm. diameter, the diameter of the sieve holes is also important.

FIG. 8 shows a section of the sieve part 48 in which the sieve holes are shown partly with a diameter of 1.4 mm.

Experiments have, for example, given the values set forth in the following table:

| Particle size | Mill according to the invention, percent | Ordinary beater mechanism, percent | Grinding mechanism, percent |
| --- | --- | --- | --- |
| Powder content | 9 | 28 | 10 |
| 0.3 to 0.5 mm | 37.5 | 11.9 | 37 |
| 0.6 to 0.8 mm | 42.0 | 23.8 | 43 |
| 0.9 to 1.3 mm | 11.0 | 19.1 | 9 |
| Exceeding 1.3 mm | | 16.6 | 1 |

The beater knife 46 preferably consists of a single strip of sheet steel of the same width and thickness with its ends bent upwards at an angle. The sheet thickness can be about 4 to 5 mm.

To enable the sieve 48 to be easily cleaned the joint between the ground product cup 51 and the flange 44 which closes the cup 40 accommodating the motor, is located under the lower edge of the sieve when the mill is in operative position.

The bottom 52 of the ground product cup 51 is preferably so constructed that it can serve as supporting surface for the mill when it is being emptied.

I claim:

An electrically driven coffee mill comprising a housing, a motor in the lower part of the housing, a motor shaft vertically mounted in the housing and having a beater knife mounted on the upper end of the shaft above the motor, a sieve concentrically mounted around the shaft spaced from the beater knife, and a container provided around the sieve to catch the coffee ground by the beater knife after passing through the sieve, the container engages over the sieve from above and is sealed against the housing below the sieve, is removable in upward direction, and extends above the sieve to form a dome-shaped space for the column of the coffee to be ground in the sieve.

References Cited by the Examiner
UNITED STATES PATENTS

| | | | |
| --- | --- | --- | --- |
| 1,750,573 | 3/30 | Crowe | 241—90 X |
| 2,822,846 | 2/58 | Ward | 241—86 X |
| 2,886,254 | 5/59 | Rohlinger | 241—86 X |

FOREIGN PATENTS

| | | |
| --- | --- | --- |
| 1,123,759 | 6/56 | France. |
| 1,225,384 | 2/60 | France. |

J. SPENCER OVERHOLSER, *Primary Examiner.*

E. J. MICHAEL, *Examiner.*